United States Patent
Schmitz

[19]

[11] Patent Number: 5,821,737
[45] Date of Patent: Oct. 13, 1998

[54] INDEPENDENT HIGH-VOLTAGE POWER SUPPLY FOR AN INTERNAL-COMBUSTION ENGINE, INCLUDING AN ONBOARD D.C. SOURCE FOR USE AT LOW ENGINE RPM'S

[75] Inventor: Günter Schmitz, Aachen, Germany

[73] Assignee: FEV Motorentechnik GmbH & Co. KG, Aachen, Germany

[21] Appl. No.: 604,053

[22] Filed: Feb. 20, 1996

[30] Foreign Application Priority Data

Feb. 20, 1995 [DE] Germany .................. 295 02 771.1

[51] Int. Cl.[6] .................................................. H02P 9/00
[52] U.S. Cl. ............................ 322/24; 322/7; 322/28
[58] Field of Search ..................... 322/24, 7, 8, 28; 290/1 R; 320/61

[56] References Cited

U.S. PATENT DOCUMENTS

| | | | |
|---|---|---|---|
| 4,419,618 | 12/1983 | Gretsch ......................................... | 322/7 |
| 4,692,684 | 9/1987 | Schaeffer ..................................... | 322/90 |
| 4,884,018 | 11/1989 | Meuret et al. ............................... | 322/8 |
| 5,057,763 | 10/1991 | Torii et al. ................................... | 322/8 |
| 5,066,866 | 11/1991 | Hallidy ......................................... | 290/1 R |
| 5,072,098 | 12/1991 | Matthews et al. ......................... | 219/501 |
| 5,606,244 | 2/1997 | Migdal ......................................... | 322/7 |
| 5,686,818 | 11/1997 | Scaduto ...................................... | 320/61 |

FOREIGN PATENT DOCUMENTS 39 23 477   4/1991   Germany .

*Primary Examiner*—Steven L. Stephan
*Assistant Examiner*—Nicholas Ponomarenko
*Attorney, Agent, or Firm*—Spencer & Frank

[57] ABSTRACT

A power supply for delivering voltage for use in an internal-combustion engine includes an onboard d.c. power source; an alternator connected to the d.c. power source and having an output for supplying a normal, onboard-network voltage during engine run; a step-up transformer having a primary winding and a secondary winding; and an inverter having an input connected to the d.c. power source and an output. There is further provided a change-over switch that has a first input connected to the output of the alternator, a second input connected to the output of the inverter and an output connected to the primary winding of the transformer. The change-over switch has a first switching state connecting the output of the alternator with the primary winding and a second switching state connecting the inverter with the primary winding. An rpm-responsive arrangement sets the change-over switch into the second switching state from the first switching state when the engine-rpm falls below a predetermined magnitude.

2 Claims, 3 Drawing Sheets

INDEPENDENT HIGH-VOLTAGE POWER SUPPLY FOR AN INTERNAL-COMBUSTION ENGINE, INCLUDING AN ONBOARD D.C. SOURCE FOR USE AT LOW ENGINE RPM'S

CROSS REFERENCE TO RELATED APPLICATION

This application claims the priority of German Application No. 295 02 771.1 filed Feb. 20, 1995, which is incorporated herein by reference.

BACKGROUND OF THE INVENTION

This invention relates to a device for generating high electric voltages in a partial network which is associated with a piston-type internal-combustion engine and which is independent from the onboard network (power supply). The device includes an a.c. current generator which is driven by the engine and which is connected with a d.c. current source.

In internal combustion engines of current design, instead of mechanically actuated and/or controlled systems, with increasing frequency systems are used which are operated and/or controlled by electromagnetic actuators and which must satisfy the continuously increasing requirements for the most varied kind. Such electromagnetic actuators must have high operating speeds as well as accurate, reproducible operating times, while working at small losses. Such actuators are needed, for example, for electromagnetically operated fuel injection valves or for electromagnetic setting devices for operating the cylinder valves (intake and exhaust valves) in a piston-type internal-combustion engine.

An actuator of the above-outlined type for the electromagnetic operation of the cylinder valves is disclosed in German Offenlegungsschrift (application published without examination) 39 23 477. To satisfy the requirements, it is necessary that the current for attracting or catching the armature, on the one hand and for holding the armature, on the other hand be different because the magnetic field strengths required for holding the armature are, as a rule, less than those required for attracting or catching the armature.

By means of a correspondingly high-ohmic design of the electromagnets, the required (non-regulated) holding current may be supplied by the conventional 12-volt onboard network voltage. The required currents and cable cross sections for such an arrangement are favorable as far as costs, reliability and the suppression of radiation leaks (stray electromagnetic fields which "leak" from the cable) are concerned. For the rapid attraction and catching of the armature, however, a significantly higher voltage has to be provided than that which is given by the 12-volt onboard network. The possibility of an otherwise available short-period supply of a high voltage from a previously charged condenser, however, cannot be considered because of the high current requirement of an actuator for operating the cylinder valves. Likewise, the use of a d.c.-d.c. converter which could change the 12-volt onboard voltage into higher voltages is not practical because of additional high costs and because of additional losses which, based on the efficiency of the generator and a high output requirement, are to be given primary consideration.

It is a particular problem in connection with the operating elements in a piston-type internal-combustion engine that such elements need to be actuated in the required manner as early as the engine start and that neither the onboard battery nor the generator which rotates during engine start is able to supply the required high voltages.

SUMMARY OF THE INVENTION

It is an object of the invention to provide an improved power supply of the above-outlined type which is capable of supplying high voltages even during engine start.

This object and others to become apparent as the specification progresses, are accomplished by the invention, according to which, briefly stated, the power supply delivering voltage for use in an internal-combustion engine includes an onboard d.c. power source; an alternator connected to the d.c. power source and having an output for supplying a normal, onboard-network voltage during engine run; a step-up transformer having a primary winding and a secondary winding; and an inverter having an input connected to the d.c. power source and an output. There is further provided a change-over switch that has a first input connected to the output of the alternator, a second input connected to the output of the inverter and an output connected to the primary winding of the transformer. The change-over switch has a first switching state connecting the output of the alternator with the primary winding and a second switching state connecting the inverter with the primary winding. An rpm-responsive arrangement sets the change-over switch into the second switching state from the first switching state when the engine-rpm falls below a predetermined magnitude.

The power supply according to the invention has the advantage that during standstill of the engine as well as at low rpm's of the alternator, the primary winding of the transformer may receive, via the low, onboard-network voltage, an a.c. current so that the transformer may supply the required high voltage of the partial network. The high voltages to be supplied by the transformer may be between 24 V and approximately 250 V, dependent upon the required use. The design of the transformer is, however, not limited to such a voltage range. The supply of higher voltages is also possible by an appropriate selection of the winding ratio of the transformer. Expediently, the alternator is a three-phase generator; in such a case, the transformer is likewise of three-phase design.

According to a preferred embodiment of the invention, the transformer is integrated in the alternator. In this construction the exciting winding of the alternator also functions as the primary winding of the transformer, while the secondary winding of the transformer is constituted by a high-voltage stator winding of the alternator, provided in addition to its low-voltage stator winding. This arrangement provides that during standstill of the engine and at low rpm's an a.c. current is applied to the exciting winding of alternator from the inverter, rather than a d.c. current taken from the onboard battery. Thus, this part of the alternator is functionally converted into a transformer in which the exciting winding forms the primary winding and the additional high-voltage stator winding forms the secondary winding. Here too, expediently a three-phase generator is used.

DESCRIPTION OF THE PREFERRED EMBODIMENTS

Figure 1:
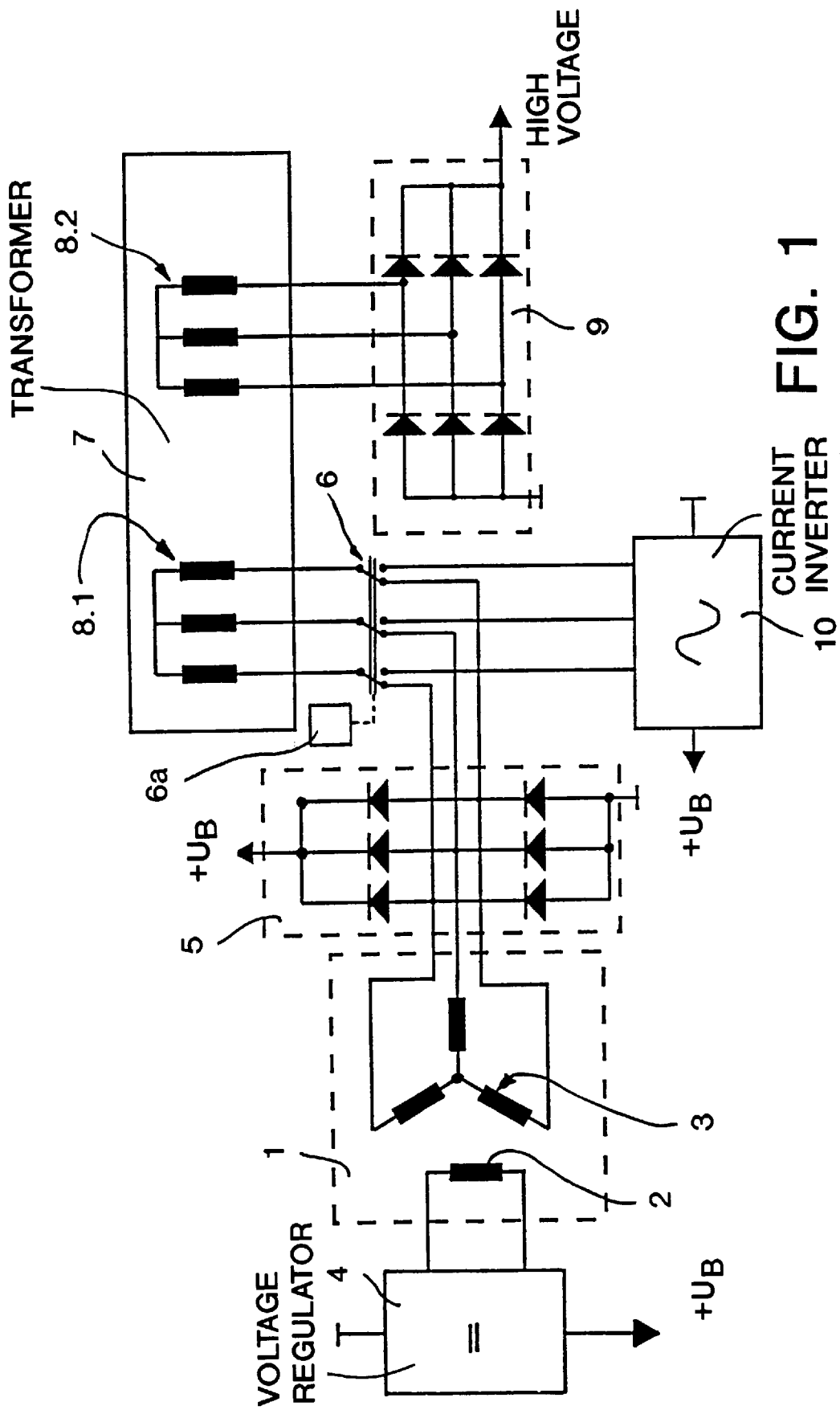
FIG. 1 is a circuit diagram of a preferred embodiment of the invention, operating with a separate transformer.

The power supply illustrated in FIG. 1 includes a three-phase alternator 1 which has an exciting winding 2 as well as a low-voltage stator winding 3 for the normal, 12 V power supply of the onboard network. The exciting winding 2 is connected, with the intermediary of a d.c. voltage regulator 4, with an onboard battery symbolized by its positive terminal +$U_B$. The three-phase current used by the alternator 1 is rectified by a rectifier 5 for use in the onboard network.

The stator winding 3 of the alternator 1 is further connected with an input of a switch 6 which, by means of an rpm-responsive actuating device 6a may be switched between two switching states as a function of a predetermined minimum rpm.

An inverter 10 has an input connected to the battery terminal +$U_B$ and an output connected to an input of the switch 6.

The output of the switch 6 is connected to the primary winding 8.1 of a three-phase step-up transformer 7. The secondary winding 8.2 of the transformer 7 supplies to the partial network the required high voltage via a corresponding high-voltage rectifier 9.

When the engine and thus the alternator 1 run with a normal rpm, the change-over switch 6 is in the switching state in which the transformer 7 and the rectifier 5 are supplied with current directly from the alternator 1 as illustrated in FIG. 1.

When the internal-combustion engine is to be started (alternator rpm n=0) and thus the alternator 1 is turned by a non-illustrated starter with a low rpm (the starter rpm is lower than a predetermined minimum rpm), neither the onboard battery nor the alternator is capable of supplying a sufficient voltage for generating the high voltage. Since the rpm-dependent switch 6 is then switched over to its other switching state and thus connects the transformer 7 with the current inverter 10 which is supplied with current from the onboard battery, the engine starting operation may be performed while actuating the fuel injection valves and/or the electromagnetically operated cylinder valves. Since the inverter 10 is supplied with current from the onboard battery, a high voltage is present to a full extent at the input of the high-voltage rectifier 9 as early as the moment the starter starts turning the alternator 1. As the engine rpm increases, the predetermined minimum rpm is reached, whereupon the switch 6, actuated by the rpm-responsive device 6a, is placed into its other switching state in which the transformer 7 is supplied directly from the alternator 1.

Figure 2:
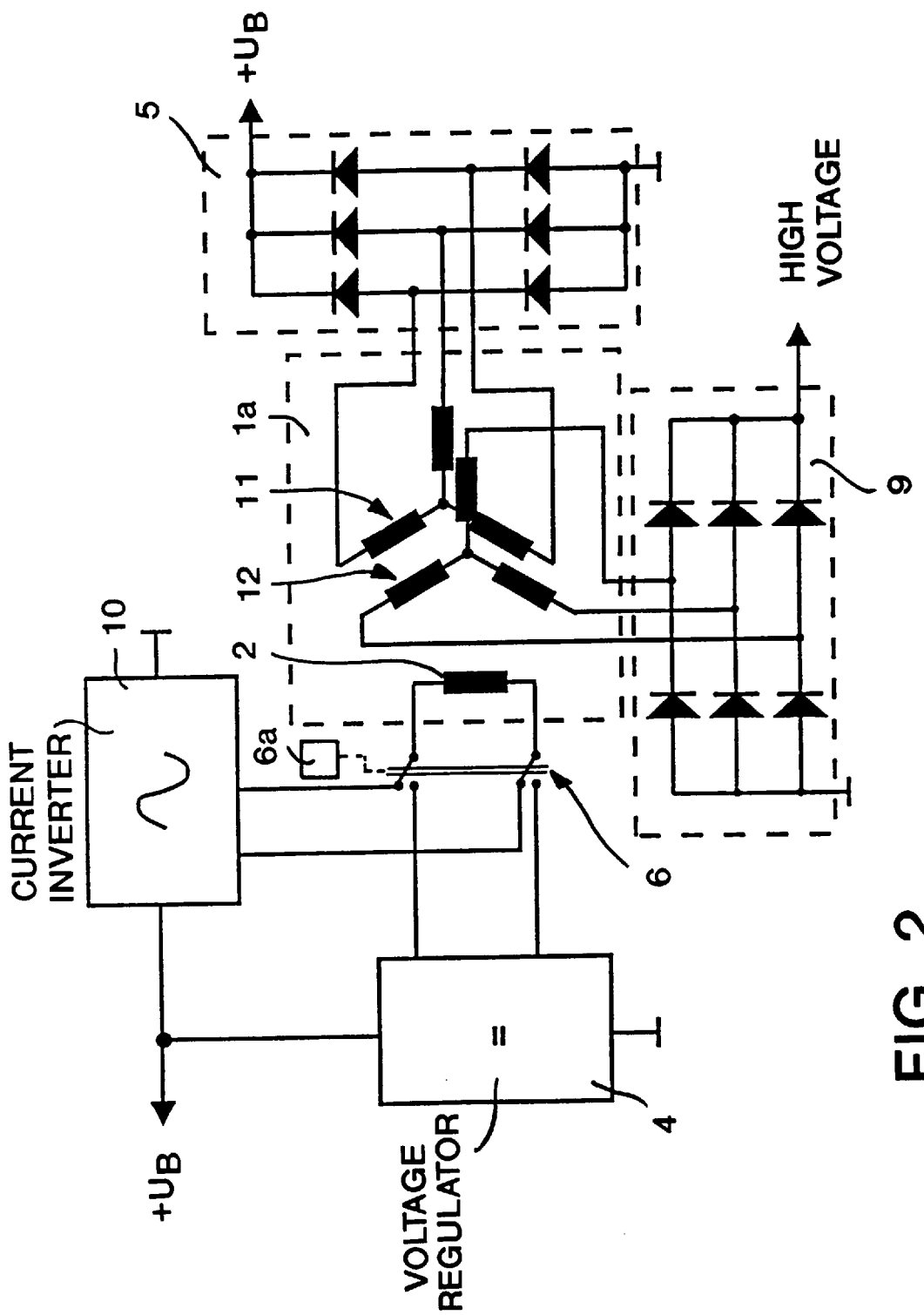
FIG. 2 is a circuit diagram of another preferred embodiment of the invention, operating with a transformer integrated in a three-phase generator.

The electrical aspects of the embodiment shown in FIG. 2 correspond to the embodiment illustrated in FIG. 1. The FIG. 2 embodiment differs structurally from the FIG. 1 embodiment essentially in that the transformer which functionally corresponds to the transformer 7 of the embodiment according to FIG. 1 is incorporated in the alternator 1a. For this purpose, in addition to a low-voltage stator winding 11 which supplies the onboard network via the rectifier 5, the alternator 1a is provided with a second, high-voltage stator winding 12 which is connected to the high-voltage rectifier 9. In principle, the winding 12 may have less than three phases; in such a case, however, the quality of the high-voltage supply is dependent from the standstill position of the rotor so that a three-phase winding is to be regarded as a preferred construction. The exciting winding 2 forms the primary winding and the additional, high-voltage stator winding 12 forms the secondary winding of a "transformer".

The output of the rpm-responsive switch 6 is, in this embodiment, coupled with the exciting winding 2 of the alternator 1a. One input of the switch 6 is coupled to the output of the inverter 10, whereas another input of the switch 6 is connected to the output of the d.c. voltage regulator 4. Thus, when the engine is at a standstill or before it reaches a predetermined minimum rpm, the switch 6 first connects the exciting winding 2 with the inverter 10 and when the predetermined minimum rpm is exceeded, the switch 6 is set into its other state in which it connects the exciting winding 2 with the d.c. voltage regulator 4. The rectifier 4 and the inverter 10 are, as described earlier, supplied with the current of the onboard network.

Although the efficiency of the alternator structure described in connection with FIG. 2, because of its relatively short-period use, plays very little role, if any, as concerns the overall efficiency of the system, for the purpose of minimizing the eddy-current losses, the armature too, that is, the core of the exciting winding is expediently iron-plated.

The rpm-responsive switch 6 described in connection with the embodiments according to FIGS. 1 and 2 may be other than a mechanical switching assembly. Therefore, by such a switch there is meant, within the meaning of the invention, not only mechanical switching elements, but also switching arrangements in which, as a function of an input information, for example, a predetermined minimum rpm, either a d.c. voltage or an a.c. voltage appears at the output.

The predetermined minimum rpm which triggers the switching process also need not be made available by a direct rpm signal which is sensed by rpm sensors associated with the alternator shaft or the engine shaft or which is supplied by a tachogenerator. Rather, indirect rpm-dependent magnitudes too, may be taken as a setting signal for triggering the switching process: thus, for example, a voltage or current taken directly from the alternator proper may be used, since they represent an rpm-dependent magnitude in the ranges which are of interest here.

Figure 3:
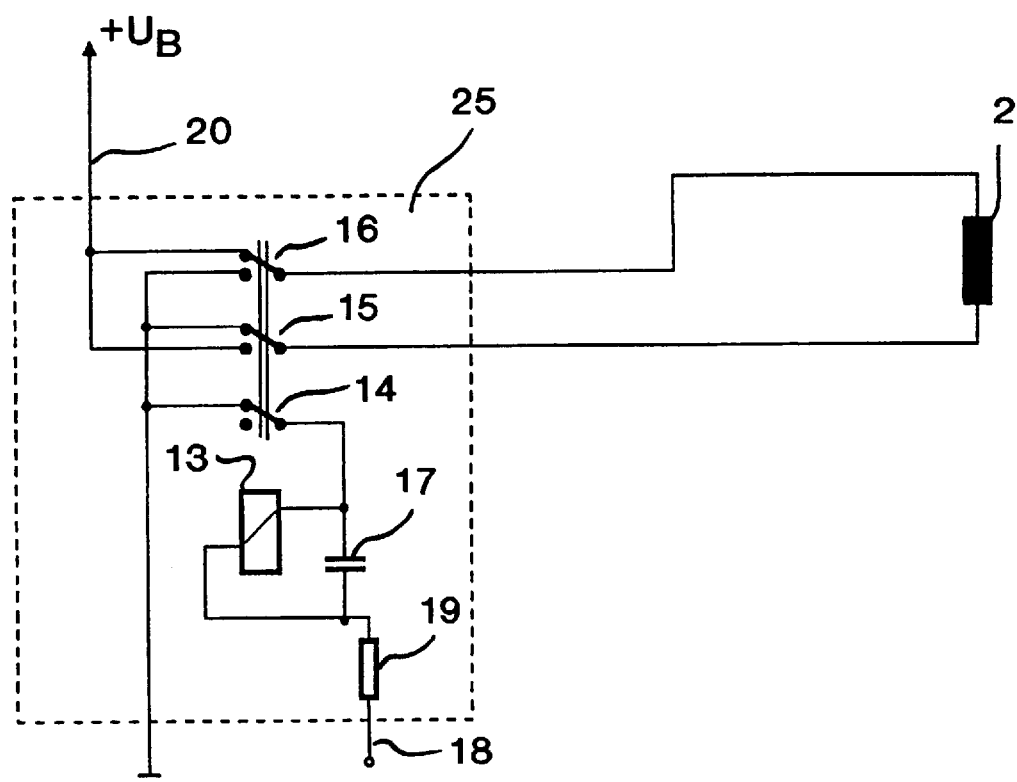
FIG. 3 is a circuit diagram of a change-over switching arrangement for use in the embodiments of FIGS. 1 and 2.

FIG. 3 shows a unit 25 which combines the functions of the change-over switch 6 and the inverter 10. The circuit of the unit 25 is, for a better understanding of the principle, represented by mechanical switching elements but is, in practice, realized by semiconductor components having the same function. Such a circuit may be installed in the embodiments according to FIGS. 1 and 2 for replacing the switch 6. The output of the unit 25 is connected with the primary winding 8.1 of the transformer 7 of the embodiment according to FIG. 1, and with the exciting winding 2 of the alternator 1a of the embodiment according to FIG. 2. The latter connection is illustrated in FIG. 3.

The circuit of the unit 25 includes a relay 13 which has three switching contacts 14, 15 and 16 and with which a condenser 17 is parallel-connected. The relay 13 and the condenser 17 are connected through a resistor 19 with the input 18 for applying an rpm information signal. An input terminal 20 is connected to the positive terminal +$U_B$ of the onboard battery.

When the engine is running and thus the operational rpm is above the predetermined minimum rpm, the rpm shortfall-representing signal at the input 18 is inactive and is, for example, 0 V. Thus, during such an operation the relay 13 is in its position of rest and the contacts 15 and 16 connect the two terminals of the primary winding 2 with the onboard network. When the engine rpm falls below the predetermined minimum rpm, for example, when the engine is at a standstill, the rpm shortfall-representing signal is active at the input 18 and may have a magnitude of, for example, 12 V. In response, after a short delay period determined by the resistor 19 and the condenser 17, the relay 13 attracts and effects a reversal of the current flow in the exciting winding 2 via the switching contacts 15 and 16. At the same time, by virtue of opening the switching contact 14, the circuit for the relay 13 is interrupted and after a short period of delay which is effected by the condenser 17, the relay 13 again drops and re-establishes, via the contacts 15 and 16, the earlier polarity of the current flowing through the exciting winding 2. By virtue of the simultaneous closing of the contact 14 the relay 13 again attracts with a delay so that the above-described switching process is repeated. Thus, as long as the rpm shortfall-representing signal is present at the input 18, the polarity of the current through the exciting winding 2 is continuously reversed which corresponds to the application of an alternating current. The above-described mode of operation also occurs when instead of the exciting winding 2, the primary winding 8.1 of a separate transformer 7 described in connection with FIG. 1 is coupled to the switch/inverter unit 25.

Thus, the unit 25 which, instead of the described mechanical elements may be constructed of semiconductor components, combines the functions of an rpm-responsive switch and an inverter and consequently, when the unit 25 is used in conjunction with the embodiment of FIG. 1 or 2, the separate inverter 10 may be dispensed with.

It will be understood that the above description of the present invention is susceptible to various modifications, changes and adaptations, and the same are intended to be comprehended within the meaning and range of equivalents of the appended claims.

What is claimed is:

1. A power supply delivering voltage for use in an internal-combustion engine, comprising
   (a) an onboard d.c. power source;
   (b) an alternator adapted to be driven by the engine and being connected to said d.c. power source and having an output for supplying a normal, onboard-network voltage during engine run;
   (c) a step-up transformer having a primary winding and a secondary winding;
   (d) an inverter having an input connected to said d.c. power source and an output;
   (e) a change-over switch having a first input connected to said output of said alternator; a second input connected to said output of said inverter and an output connected to said primary winding of said transformer; said change-over switch having a first switching state connecting said output of said alternator with said primary winding and a second switching state connecting said inverter with said primary winding; and
   (f) rpm-responsive means for setting said change-over switch into said second switching state from said first switching state when an engine-rpm falls below a predetermined magnitude.

2. A power supply for an internal-combustion engine, comprising
   (a) an onboard d.c. power source;
   (b) an alternator adapted to be driven by the engine and being connected to said d.c. power source and having an output for supplying a normal, onboard-network voltage during engine run; said alternator being a three-phase current generator having an exciting winding, a low-voltage stator winding and a high-voltage stator winding;
   (c) a step-up transformer having a primary winding formed by said exciting winding and a secondary winding formed by said high-voltage stator winding;
   (d) an inverter having an input connected to said d.c. power source and an output;
   (e) a change-over switch having a first input connected to said output of said alternator; a second input connected to said output of said inverter and an output connected to said primary winding of said transformer; said change-over switch having a first switching state connecting said output of said alternator with said primary winding and a second switching state connecting said inverter with said primary winding; and
   (f) rpm-responsive means for setting said change-over switch into said second switching state from said first switching state when an engine-rpm falls below a predetermined magnitude.

* * * * *